US009664895B2

(12) United States Patent
Xu et al.

(10) Patent No.: US 9,664,895 B2
(45) Date of Patent: May 30, 2017

(54) LIGHT-SHIELDING STRUCTURE AND METHOD FOR MANUFACTURING THE STRUCTURE, DISPLAY DEVICE AND METHOD FOR DISPLAYING WITH DISPLAY DEVICE

(71) Applicants: Boe Technology Group Co., Ltd., Beijing (CN); Beijing Boe Display Technology Co., Ltd., Beijing (CN)

(72) Inventors: Liyan Xu, Beijing (CN); Chunbing Zhang, Beijing (CN)

(73) Assignees: Boe Technology Group Co., Ltd., Beijing (CN); Beijing Boe Display Technology Group Co., Ltd., Beijing (CN)

( * ) Notice: Subject to any disclaimer, the term of this patent is extended or adjusted under 35 U.S.C. 154(b) by 160 days.

(21) Appl. No.: 14/499,656

(22) Filed: Sep. 29, 2014

(65) Prior Publication Data

US 2015/0338638 A1    Nov. 26, 2015

(30) Foreign Application Priority Data

May 26, 2014    (CN) .......................... 2014 1 0224835

(51) Int. Cl.
 G02B 26/02    (2006.01)
 G02F 1/1335    (2006.01)
(52) U.S. Cl.
 CPC ..... G02B 26/026 (2013.01); G02F 1/133512 (2013.01); G02F 2203/62 (2013.01); Y10T 29/49119 (2015.01)
(58) Field of Classification Search
 CPC ............... G02B 26/06; G02F 1/133512; G02F 2203/62; Y10T 29/49119
 (Continued)

(56) References Cited

U.S. PATENT DOCUMENTS 5,961,804 A * 10/1999 Jacobson ................ G02F 1/167
 204/450
8,982,447 B2 * 3/2015 Shen ....................... G02F 1/167
 359/228

(Continued)

FOREIGN PATENT DOCUMENTS

CN    101896956    11/2010
CN    103576404    2/2014
 (Continued)

OTHER PUBLICATIONS

Office action from Chinese Application Serial No. 201410224835.5 dated Apr. 1, 2016.

(Continued)

*Primary Examiner* — Bumsuk Won
*Assistant Examiner* — Grant Gagnon
(74) *Attorney, Agent, or Firm* — Calfee, Halter & Griswold LLP

(57) ABSTRACT

The present invention provides a light-shielding structure, a method for manufacturing the structure, a display device and a method for displaying with the display device. Said light-shielding structure comprises a plurality of micro light-shielding boxes, each of the micro light-shielding boxes comprises a sealed cavity provided with a transparent solvent, a first electrode and a second electrode disposed oppositely, and at least one rotator disposed between said first electrode and said second electrode. Said rotator comprises a light-shielding portion and a transparent portion, and said light-shielding portion has an electrical property different with that of said transparent portion. The light-shielding structure in the embodiments of the present invention comprises at least one rotator, which is controlled to rotate by means of the electrodes at two sides thereof. When the light leakage region in the color film substrate needs light shielding, at least one rotator is controlled to form a light-shielding band to shield the light leakage region of the color film substrate; when it does not need light shielding, the at (Continued)

least one rotator is controlled to rotate such that the formed transparent band is aligned with the light leakage region. This improves the transmittance of the display panel, thereby solving the problem of light leakage at pixel edge without sacrificing the transmittance of the panel.

7 Claims, 3 Drawing Sheets

(58) Field of Classification Search
USPC .......................................................... 359/228
See application file for complete search history.

(56) References Cited

U.S. PATENT DOCUMENTS

2013/0286464 A1    10/2013  Kaneko et al.
2015/0253473 A1*   9/2015   Liu .................. G02F 1/133533
                                                       359/884

FOREIGN PATENT DOCUMENTS

| JP | 2002-122891 | 4/2002 |
| JP | 2004-197083 | 7/2004 |
| JP | 2008-170647 | 7/2008 |
| KR | 20020075680 | 10/2002 |
| KR | 20100120589 | 11/2010 |

OTHER PUBLICATIONS

Office action from Chinese Application Serial No. 201410224835.5 dated Aug. 10, 2016.

* cited by examiner

LIGHT-SHIELDING STRUCTURE AND METHOD FOR MANUFACTURING THE STRUCTURE, DISPLAY DEVICE AND METHOD FOR DISPLAYING WITH DISPLAY DEVICE

RELATED APPLICATIONS

The present application claims the benefit of Chinese Patent Application No. 201410224835.5, filed May 26, 2014, the entire disclosure of which is incorporated herein by reference.

FIELD OF THE INVENTION

The present invention relates to the field of display, in particular to a light-shielding structure, a method for manufacturing the structure, a display device and a method for displaying with the display device.

BACKGROUND OF THE INVENTION

A liquid crystal panel primarily comprises a color film substrate, an array substrate and liquid crystal filled between these two substrates. The liquid crystal panel controls the orientation of liquid crystal molecules with electric field and changes the transmittance by means of anisotropy of the liquid crystal refractive index so as to perform display.

In the prior art, the array substrate in the liquid crystal panel is provided with a plurality of parallel grating lines and data lines perpendicularly crossing the grating lines. The region enclosed by the grating lines and data lines is called one unit pixel region. The color film substrate mainly comprises a substrate, a black matrix (BM) and color filter layers of different colors. Wherein the black matrix is disposed on the substrate; and the region on the substrate, which is not covered by the black matrix, forms a sub-pixel opening region on which color filter layers of different colors are disposed in a certain arrangement manner.

When the array substrate and the color film substrate are cell assembled, the position of the pixel region is aligned with that of the sub-pixel opening region, the color filter layers of different colors achieve color display; and the black matrix is used for shielding the grating lines, data lines and pixel edge region so as to prevent the display from being affected by light leakage.

However, in the prior art, since there is difference between design values and actual values during the formation of the black matrix on the color film substrate, such that the formed black matrix is relatively narrow, or alignment of the array substrate and the color film substrate during the cell assembly is offset. All the above deficiencies would lead to the phenomenon of pixel light leakage at the edges of the black matrix, thereby influencing the display effect of the display panel.

SUMMARY OF THE INVENTION

The technical problem to be solved by the present invention is to provide a light-shielding structure and a method for manufacturing the structure, a display device and a method for displaying with the display device, to solve the phenomenon of light leakage on the color film substrate.

In order to solve the above technical problem, the technical solution of the present invention provides a light-shielding structure comprising a plurality of micro light-shielding boxes, each of the micro light-shielding boxes comprises a sealed cavity provided with a transparent solvent, a first electrode and a second electrode disposed oppositely, and at least one rotator disposed between said first electrode and said second electrode. Said rotator comprises a light-shielding portion and a transparent portion, and said light-shielding portion has an electrical property different with that of said transparent portion.

Further, said rotator has a spherical shape, in which the light-shielding portion has the same volume as the transparent portion.

Further, said rotator has a diameter ranged from 0.6 L to 1 L, wherein L is a distance between said first electrode and said second electrode.

Further, the plurality of light-shielding boxes in said light-shielding structure are arranged in an array.

In order to solve the above technical problem, the present invention further provides a method for manufacturing a light-shielding structure, comprising: manufacturing an insulator film on a first substrate, and patterning said insulator film to form isolation structures of said micro light-shielding boxes; manufacturing a transparent metal thin film on said first substrate, and patterning said transparent metal thin film to form a first electrode and a second electrode disposed oppositely inside said isolation structure; injecting a transparent solvent and at least one rotator between said first electrode and said second electrode, said rotator comprising a light-shielding portion and a transparent portion, said light-shielding portion having an electrical property different with that of said transparent portion; cell assembling said second substrate and said first substrate to form sealed cavities of said micro light-shielding boxes.

Further, said rotator has a spherical shape, in which the light-shielding portion has the same volume as the transparent portion.

Further, said rotator has a diameter ranged from 0.6 L to 1 L, wherein L is a distance between said first electrode and said second electrode.

In order to solve the above technical problem, the present invention further provides a display device comprising a color film substrate and a light-shielding structure according to any one of the above embodiments. Said light-shielding structure is disposed on said color film substrate.

Further, said color film substrate comprises light leakage regions. The at least one rotator in said light-shielding structure is disposed to be aligned with said light leakage region.

Further, said rotator has a spherical shape and has a diameter greater than a width of said light leakage region.

In order to solve the above technical problem, the present invention further provides a displaying method for said display device, comprising: applying a first electric field on said at least one rotator with said first electrode and second electrode when the light leakage region in said color film substrate needs light-shielding, such that the light-shielding portion of said at least one rotator is disposed to be aligned with said light leakage region; applying a second electric field on said at least one rotator with said first electrode and second electrode when the light leakage region in said color film substrate does not need light-shielding, such that the transparent portion of said at least one rotator is disposed to be aligned with said light leakage region.

The light-shielding structure in the embodiments of the present invention comprises at least one rotator, and the rotation of said at least one rotator is controlled by the electrodes at two sides of the rotator. When the light leakage region in the color film substrate needs light shielding, the at least one rotator is controlled to form a light-shielding band to shield the light leakage region of the color film substrate; when light shielding is not required, the at least one rotator is controlled to rotate to make the formed transparent band aligned with the light leakage region. This improves the transmittance of the display panel, thereby solving the problem of light leakage at pixel edge without sacrificing the transmittance of the panel.

DETAILED DESCRIPTION OF THE INVENTION

Detailed embodiments of the present invention are further described as follows in detail in combination with the drawings and embodiments. The following embodiments are used to explain the present invention rather than to limit the scope of the present invention.

Figure 1:
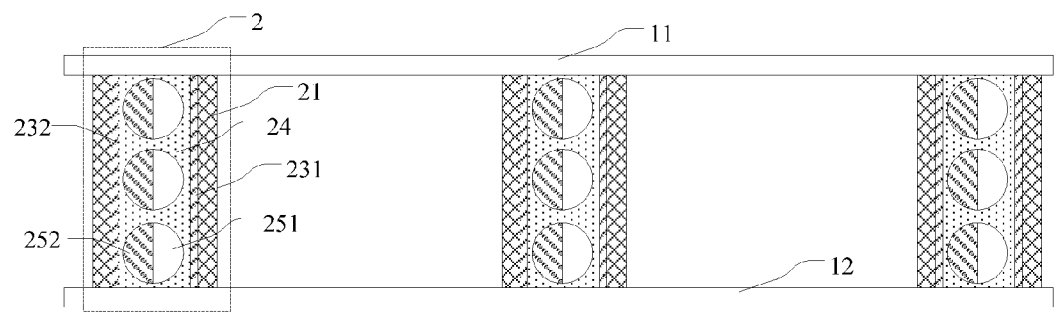
FIG. 1 is a schematic diagram of a light-shielding structure provided in the embodiments of the present invention.

FIG. 1 is a schematic diagram of a light-shielding structure provided in the embodiments of the present invention. Said light-shielding structure comprises a plurality of micro light-shielding boxes 2, wherein each of said micro light-shielding boxes 2 comprises a sealed cavity, which sealed cavity is provided with a transparent solvent 24, a first electrode 231 and a second electrode 232 disposed oppositely, and at least one rotator disposed between said first electrode 231 and said second electrode 232; said rotator comprises a light-shielding portion 252 and a transparent portion 251, and said light-shielding portion 252 has an electrical property different with that of said transparent portion 251.

The rotator can form a permanent dipole by making the light-shielding portion positively charged and the transparent portion negatively charged. Said rotator may be spherical, in which the light-shielding portion 252 has the same volume as the transparent portion 251. Specifically, referring to FIG. 1, in said light-shielding structure, a first substrate 11, a second substrate 12 and an isolation structure 21 therebetween form a sealed cavity of the micro light-shielding box 2. Said sealed cavity is filled with a transparent solvent 24 and provided with at least one rotator, a first electrode 231, and a second electrode 232 disposed opposite to the first electrode 231, wherein the first electrode 231 and the second electrode 232 are made of transparent materials.

Figure 2:
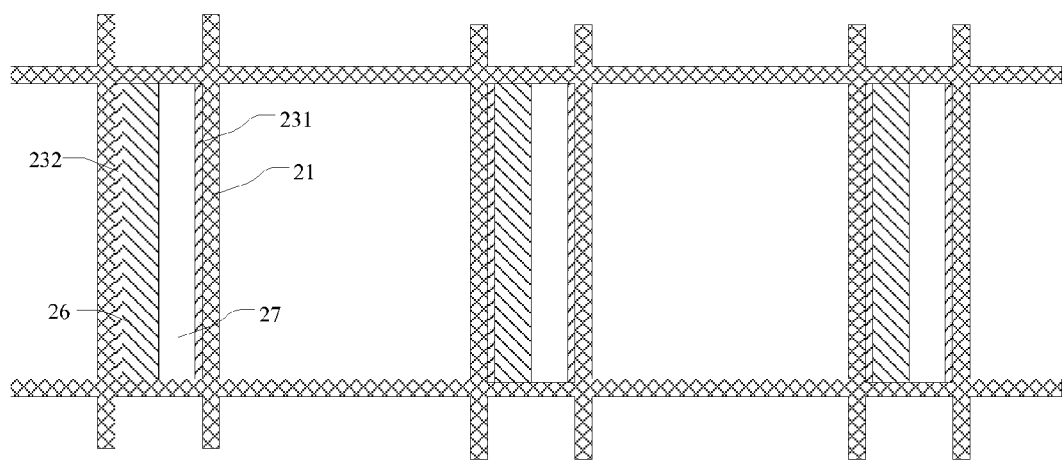
FIG. 2 is a top view of the light-shielding structure shown in FIG. 1.

For example, the light-shielding portion 252 can be positively charged while the transparent portion 251 can be negatively charged. When the first electrode 231 is added with positive electricity and the second electrode 232 is added with negative electricity (the arrangement of the at least one rotator is shown in FIG. 1, and the top view thereof is shown in FIG. 2), a light-shielding band 26 is formed at the side near the second electrode 232 within said micro light-shielding box, and a transparent band 27 is formed at the side near the first electrode 231. When the first electrode 231 is added with negative electricity and the second electrode 232 is added with positive electricity, the at least one rotator is controlled by the electric field between the first electrode and the second electrode to rotate (the arrangement of the at least one rotator after rotation is shown in FIG. 3, and the top view thereof is shown in FIG. 4), such that a transparent band 27 is formed at the side near the second electrode 232 within said micro light-shielding box, and a light-shielding band 26 is formed at the side near the first electrode 231.

Figure 3:
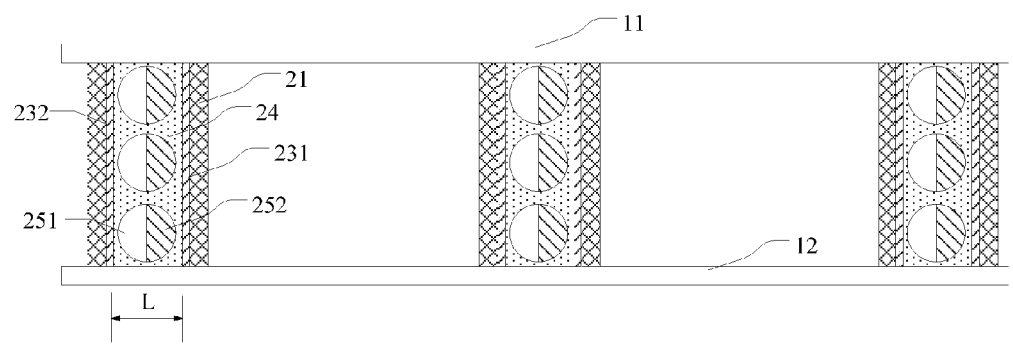
FIG. 3 is a schematic diagram of another light-shielding structure provided in the embodiments of the present invention.
Figure 4:
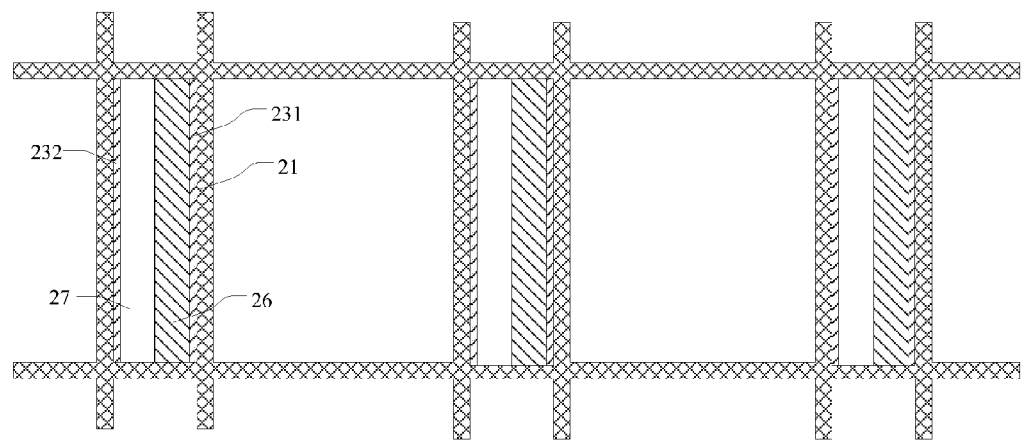
FIG. 4 is a top view of the light-shielding structure shown in FIG. 3.

Referring to FIG. 3, the rotator may have a diameter ranged from 0.6 L to 1 L, wherein L is a distance between the first electrode 231 and the second electrode 232.

In said light-shielding structure, the plurality of micro light-shielding boxes are arranged in an array.

Specifically, when there is light leakage between the black matrix and an adjacent pixel in the color film substrate, said light-shielding structure can be attached to the color film substrate, and the micro light-shielding box in the light-shielding structure is disposed to be aligned with the light leakage region of the color film substrate. When the light leakage region in said color film substrate needs light shielding (for example, when a low grey-scale is displayed), the light-shielding portion in the rotator in the light-shielding box can be disposed to be aligned with the light leakage region of the color film substrate, such that the light-shielding box has the function of shielding light; when it does not need light shielding (for example, when a high grey-scale is displayed, human eyes are insensitive to light leakage), then the at least one rotator is controlled to rotate by changing the electric field between the two electrodes, such that the transparent portion in the at least one rotator is disposed to be aligned with the light leakage region, thereby transmitting light. Therefore, the transmittance of the display panel is improved without influencing the display effect thereof.

In addition, the embodiments of the present invention further provide a method for manufacturing a light-shielding structure, comprising steps as follows:

S1: Manufacturing an insulator film on a first substrate, and patterning said insulator film to form isolation structures of the micro light-shielding boxes. For example, said insulator film can employ SiNx, and the formed isolation structures are shown in FIG. 2, said isolation structures are peripheral structures of the micro light-shielding boxes, serving as four faces of the sealed cavity thereof;

S2: Manufacturing a transparent metal thin film on said first substrate, and patterning said transparent metal thin film to form a first electrode and a second electrode oppositely disposed inside said isolation structure. Specifically, indium tin oxide (ITO) can be deposited on said first substrate to make a transparent metal thin film, which can be patterned using photolithography, thereby forming the first electrode and the second electrode as shown in FIG. 2;

S3: Injecting a transparent solvent and at least one rotator between said first electrode and said second electrode, said rotator comprising a light-shielding portion and a transparent portion, said light-shielding portion having an electrical property different with that of said transparent portion. For example, said rotator may be spherical, in which the light-shielding portion has the same volume as the transparent portion, and said rotator may have a diameter ranged from 0.6 L to 1 L, wherein L is a distance between the first electrode and the second electrode;

S4: cell assembling the first substrate and the second substrate to form sealed cavities of said micro light-shielding boxes. Specifically, a binder can be coated at the joint of the first substrate and the second substrate, such that they can form sealed cavities after joining, thereby forming a structure of the micro light-shielding boxes. Regarding the addition of signals to two electrodes within the micro light-shielding box, since the two electrodes are not crossed and wiring goes throughout the whole panel, signals may be provided to them separately. Specifically, they can be bonded in a manner of Chip On Film (COF) of the (array) substrate, with Anisotropic Conductive Film (ACF), then applied with different voltages.

The rotator in the embodiments of the present invention can be manufactured by, for example, the microchannel production process as proposed in the communique of JP Laid-Open No. 2004-197083.

Specifically, transparent polystyrene balls are first manufactured. Template polystyrene balls of submicron size are prepared by an emulsion polymerization method: adding, at 10~40° C., 20~30 mL of styrene monomer and deionized water having a volume ratio to styrene of 10:1~1:1 into a three-neck flask under the protection of nitrogen; stirring them for 20~30 minutes under the stirring condition of 100~500 r/min, raising the temperature in water bath to 60~80° C. at a speed of 0.5~5° C./min; formulating an aqueous solution of initiator of potassium persulfate at a concentration of 10~30 g/L, then dropping 10~50 mL of the aqueous solution of potassium persulfate into the three-neck flask, and performing the reaction at 60~80° C. for 10~24 hours; centrifugally isolating the reaction liquid after it has been cooled by 10~40° C., washing it 1~3 times respectively by deionized water and ethanol to obtain template polystyrene balls of submicron-micron size.

Thereafter, the above prepared transparent polystyrene balls can be treated by microchannel techniques. The microchannel production process thereof is as follows: by using an O/W or W/O relationship between the colored continuous phase and the spheroidizing phase, black-color colored continuous phase is successively sprayed from the first microchannel for transferring the colored continuous phase into the spheroidizing phase of the fluid medium flowing in the second microchannel, thereby producing black-color phase spherical polymer particles, which particles are bipolar spherical particle balls having positive and negative charges.

Specifically, in an oily or aqueous fluid medium containing a polymerizable resin component, the polymerizable resin component in continuous phase is colored with phase split of an insoluble colored dye/pigment contained in said medium, which polymerizable resin component is formed with different positively and negatively charged polymerizable monomers, and is transferred into the first microchannel. Next, the colored continuous phase is sprayed into the aqueous or oily spheroidizing phase flowing through the second microchannel either continuously or intermittently. Subsequently, the colored continuous phase sprayed into the spheroidizing phase is spheroidized during a series of spraying/dispersing/transferring within the microchannel, and at the same time is successively spheroidized in the spheroidizing phase. Therefore, the polymerizable resin component in said spherical particles is polymerized and cured under UV irradiation and/or heating, thereby appropriately modulating the small balls. Said colored continuous phase is colorants, which colorants is phase split into monochrome continuous hue (for example, black color can be used as such a hue), as long as they are insoluble or dispersed homogeneously in the fluid dispersion medium containing the polymerizable resin component, which are not particularly limited. Carbon black can be used as said colorant.

In the present manner, the amount of the colorant added may be properly selected in the range of 0.1~80 parts by weight, preferably 2~10 parts by weight, based on 100 parts by weight of the whole polymerizable resin component as the polymerizable and curable component in the colored continuous phase. Regarding the polymerizable resin component (or polymerizable monomer) used in the above balls, according to the type of the functional group or substituent in the polymerizable monomer used in the rotator, monomer species which exhibit (−) electrification and (+) electrification in said rotator can be enumerated. Accordingly, when at least two kinds of monomers are used as the polymerizable resin component in the present manner, while fully taking into consideration whether the monomers exhibit (+) or (−) electrification tendency, preferably, a combination of a plurality of monomers which exhibit the same type of electrification may be suitably used.

The percentage of the rotator may be 0.1~15 parts by weight, preferably 1~10 parts by weight, based on 100 parts by weight of the transparent solvent. The transparent solvent is a colorless transparent liquid having insulation characteristic, which specifically may be a nonpolar dispersion medium, and more specifically may be aliphatic hydrocarbon, aromatic hydrocarbon, halohydrocarbon and silicone oil.

The embodiments of the present invention further provide a display device comprising a color film substrate and a light-shielding structure according to the above embodiments, wherein said light-shielding structure is disposed on said color film substrate.

Figure 5:
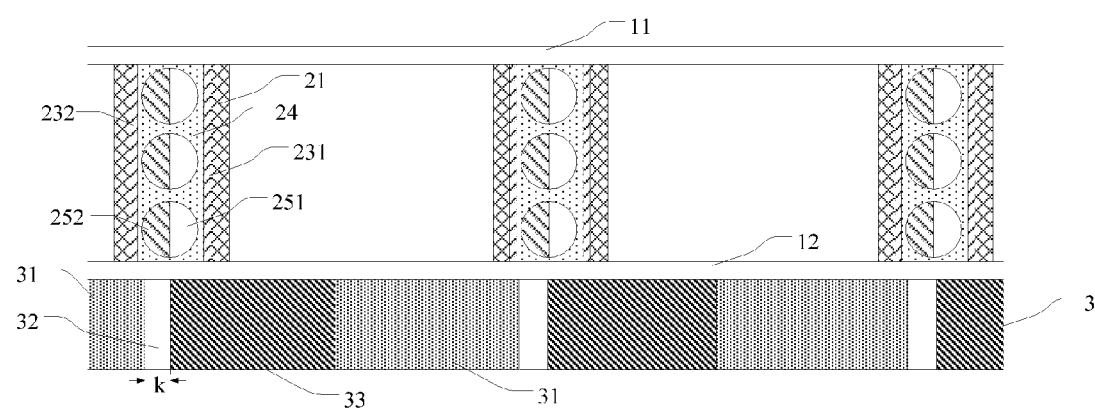
FIG. 5 is a schematic diagram of a display device provided in the embodiments of the present invention.

Referring to FIG. 5, which is a schematic diagram of a display device provided in the embodiments of the present invention, said display device comprises a color film substrate 3 and a light-shielding structure. Said light-shielding structure comprises a plurality of micro light-shielding boxes, wherein a first substrate 11, a second substrate 12 and an isolation structure 21 therebetween form a sealed cavity of each micro light-shielding box. The sealed cavity is filled with a transparent solvent 24 and provided with at least one rotator, a first electrode 231 and a second electrode 232 disposed oppositely, wherein the rotator comprises a light-shielding portion 252 and a transparent portion 251, and the light-shielding portion 252 has a electrical property different with that of the transparent portion 251.

The light-shielding structure is attached to the color film substrate. Specifically, referring to FIG. 5, the color film substrate 3 comprises a light leakage region 32 between a color filter layer 31 and a black matrix 33. During the attaching process, the at least one rotator in the light-shielding structure is disposed to be aligned with the light leakage region 32.

Figure 6:
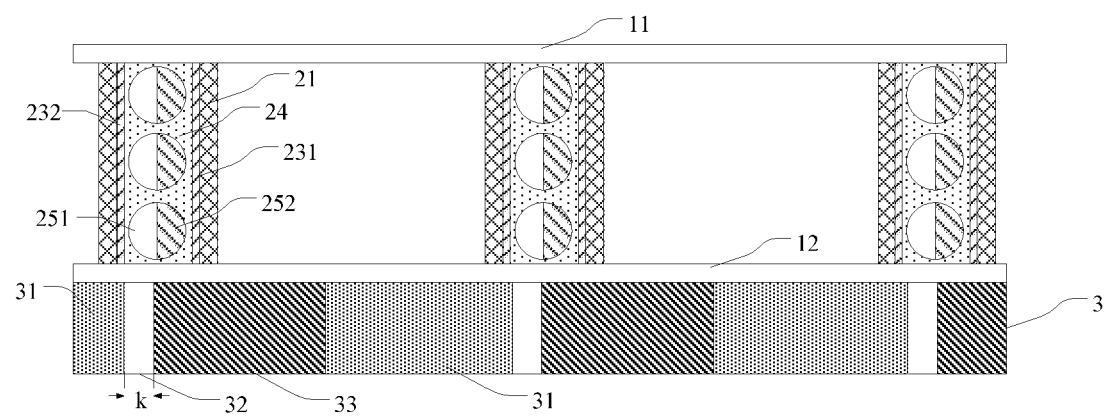
FIG. 6 is a schematic diagram of another display device provided in the embodiments of the present invention.

In the embodiments of the present invention, the size of the rotator can be set in accordance with the size of the light leakage region. Preferably, the rotator may be spherical and has a diameter greater than a width k of the light leakage region 32. By means of the above settings, though not shown in the drawings, those skilled in the art can understand that the light leakage region 32 in FIG. 5 can be selectively covered by, for example, the light-shielding band 26 or the transparent band 27 in FIG. 2 and FIG. 4. Specifically, when the pixel to which the color filter layer 31 corresponds does not display a low grey-scale, the light-shield portion in the rotator in the light-shielding box can be disposed to be aligned with the light leakage region 32 of the color film substrate (as shown in FIG. 5), such that the light-shielding box has the function of shielding light; when light shielding is not required, the at least one rotator is controlled to rotate by changing the electric field between the two electrodes, such that the transparent portion in the rotator is disposed to be aligned with the light leakage region 32 (as shown in FIG. 6), which has the function of transmitting light without influencing the display effect.

The display device provided in the embodiments of the present invention may be any product or component having display function such as notebook computer display screen, electronic paper, organic light-emitting diode display, liquid crystal display, liquid crystal television, digital frame, mobile phone, and tablet computer, etc.

The display device provided in the embodiments of the present invention comprises a light-shielding structure comprising at least one rotator which is controlled to rotate by means of the electrodes at two sides of the at least one rotator. When the light leakage region in the color film substrate needs light shielding, the at least one rotator is controlled to form a light-shielding band to shield the light leakage region of the color film substrate; when it does not need light shielding, the at least one rotator is controlled to rotate to make the formed transparent band aligned with the light leakage region so as to improve the transmittance of the panel. The display device provided in the embodiments of the present invention can solve the problem of light leakage at pixel edge without sacrificing the transmittance of the panel.

Furthermore, the present invention further provides a displaying method for the above display device, comprising: applying a first electric field to said at least one rotator with said first and second electrodes when the light leakage region in said color film substrate needs light shielding, such that the light-shielding portion of said at least one rotator is disposed to be aligned with said light leakage region; applying a second electric field to said at least one rotator with said first and second electrodes when the light leakage region in said color film substrate does not need light shielding, such that the transparent portion of said at least one rotator is disposed to be aligned with said light leakage region.

The above embodiments are only used to explain the present invention rather than to limit the present invention. Ordinarily skilled in relevant technical fields can also make various variations and modifications without departing from the spirit and scope of the present invention. Thus all the equivalent technical solutions also pertain to the scope of the present invention. The scope of the present invention shall be limited by the claims.

The invention claimed is:

1. A display device comprising:
a color film substrate; and
a light-shielding structure disposed on the color film substrate, the light shielding structure comprising:
a plurality of micro light-shielding boxes; each of the micro light-shielding boxes comprising a sealed cavity provided with a transparent solvent, a first electrode and a second electrode disposed oppositely, and at least one rotator disposed between said first electrode and said second electrode;
the rotator comprising a light-shielding portion and a transparent portion, the light-shielding portion having an electrical property different than the electrical property of the transparent portion;
wherein L is a distance between the first electrode and the second electrode; and
wherein said rotator has a spherical shape having a diameter in ranging from 0.6 L to 1 L;
wherein the color film substrate comprises light leakage regions, and at least one rotator in the light-shielding structure is disposed to be aligned with the light leakage region.

2. The display device according to claim 1, wherein the light-shielding portion has the same volume as the transparent portion.

3. The display device according to claim 1, wherein the plurality of micro light-shielding boxes in the light-shielding structure are arranged in an array.

4. The display device according to claim 1, wherein the rotator has a diameter greater than a width of the light leakage region.

5. A displaying method for the display device according to claim 1, comprising:
applying a first electric field to at least one rotator with the first and second electrodes when a light leakage region in the color film substrate needs light shielding, such that the light-shielding portion of at least one rotator is disposed to be aligned with the light leakage region; and
applying a second electric field to at least one rotator with the first and second electrodes when the light leakage region in the color film substrate does not need light shielding, such that the transparent portion of at least one rotator is disposed to be aligned with the light leakage region.

6. A method for manufacturing a display device, the method comprising:
manufacturing an insulator film on a first substrate, and patterning the insulator film to form isolation structures of micro light-shielding boxes;
manufacturing a transparent metal thin film on the first substrate, and patterning the transparent metal thin film to form a first electrode and a second electrode disposed oppositely inside the isolation structure;
injecting a transparent solvent and at least one rotator between the first electrode and the second electrode, the rotator comprising a light-shielding portion and a transparent portion, the light-shielding portion having an electrical property different than the electrical property of the transparent portion; and
cell assembling the second substrate and the first substrate to form sealed cavities of the micro light-shielding boxes, thereby forming a light-shielding structure;
wherein the light-shielding structure is disposed on a color film substrate;
wherein the color film substrate comprises light leakage regions, and at least one rotator in the light-shielding structure is disposed to be aligned with the light leakage region;
wherein L is a distance between the first electrode and the second electrode; and
wherein said rotator has a spherical shape having a diameter in ranging from 0.6 L to 1 L.

7. The method for manufacturing a display device according to claim 6, wherein the light-shielding portion has the same volume as the transparent portion.

* * * * *